United States Patent

Beeken et al.

[11] 3,729,702
[45] Apr. 24, 1973

[54] ACOUSTIC SENSING DEVICE

[75] Inventors: Basil B. Beeken, New Haven; Robert F. O'Keefe, Trumbell, both of Conn.

[73] Assignee: Automatic Switch Co., Florham Park, N.J.

[22] Filed: Dec. 21, 1970

[21] Appl. No.: 100,183

[52] U.S. Cl. ............... 340/1 R, 181/0.5 NP, 340/3 E
[51] Int. Cl. ................................................ G01s 9/68
[58] Field of Search ................ 340/1 R, 3 E, 3 R, 340/15; 181/0.5 NP

[56] References Cited

UNITED STATES PATENTS

| 3,178,677 | 4/1965 | Hadley et al. | 340/1 R |
| 2,400,309 | 5/1946 | Kock | 340/3 E |
| 3,412,370 | 11/1968 | Massal | 340/1 R |
| 3,491,332 | 1/1970 | Lomas et al. | 340/1 R |
| 3,500,952 | 3/1970 | Beeken | 181/0.5 NP |
| 2,511,599 | 6/1950 | Rochester | 340/3 E |
| 3,500,951 | 3/1970 | Beeken | 181/0.5 NP |

*Primary Examiner*—Richard A. Farley
*Attorney*—Alan H. Levine

[57] ABSTRACT

A sensing device having a high frequency sonic wave source that generates an acoustic beam is supplied by a fluid source at above ambient pressure serially connected through a normally open fluidic switch connected in the circuit as an OR gate. The sonic wave generator is disposed to direct an acoustic beam toward a target where it is reflected towards the control input of an acoustically sensitive fluidic receiver whose output is connected to the control input of the fluidic switch. The latter is modulated by the output of the receiver which is responsive to the acoustic beam in such a way that the fluidic switch is changed to a flow inhibiting condition by the receiver when the reflected acoustic beam is present and to a flow passing condition by the receiver when the reflected acoustic beam is absent. The sonic wave generator is thereby maintained in an oscillatory mode in an on-off sequence such as an equal wave multivibrator. The period of the multivibrator in the sensing device is dependent on two factors: (1) the time constant of the fluidic circuit and (2) the time of propagation of the sound from the generator to the acoustically sensitive fluidic receiver. The former is a constant which can be determined for each circuit and the latter is dependent on variable conditions external to the fluidic circuit. This permits measurement of dependent variable conditions of the system, through which the acoustic beam passes, viz. distance that the acoustic beam travels as well as temperature, density and composition of the fluid medium through which the acoustic beam travels.

4 Claims, 4 Drawing Figures

Patented April 24, 1973

INVENTORS
ROBERT F. O'KEEFE
BASIL B. BEEKEN

BY

ATTORNEY

INVENTORS
ROBERT F. O'KEEFE
BASIL B. BEEKEN

ACOUSTIC SENSING DEVICE

BACKGROUND OF THE INVENTION

This invention relates to a novel acoustic sensing system and more particularly to an acoustic sensing system which can be adapted to measure variable parameters in a hostile or explosive environment.

Fluid type sensing devices have been proposed for detecting the presence of objects in various, especially hostile, environments.

These conventional types usually employ moving parts which are usually complex, bulky and require a great degree of maintenance for trouble free use. To avoid this maintenance problem as well as to conserve on space requirements, electrical components have been substituted for use in hostile and explosive environments. However these too are bulky since they require explosion proof cases to prevent any possibility of a spark or current surge initiating an explosion. Further, it is not always possible to keep power requirements below danger levels with electrical components since the production of intelligible signals at a distance outside of the environment being measured, requires a minimum amount of power.

Thus it is quite clear that because of the size and the requisite moving parts of conventional fluid type sensing devices, their use has been limited — especially where it would appear that they would offer the most utility.

There is a present need for fluidic devices which contain no moving parts for use in many areas of various technologies, for example, in the measurement of temperature, density or composition of a sealed hostile fluid environment or where the level of an explosive fluid in a storage container must be periodically determined without subjecting man to the hostile conditions and without using mechanical or electrical energy which could trigger an explosion. Thus in these applications where size and movement of parts are of overriding importance because of the environment in which the device is to be used or because of the application to which the device is to be put, there is a need for a fluidic device which is substantially maintenance free, relatively small and safe to use in explosive environment.

The present invention is directed to an improved means for an acoustical sensing system which can be adapted to the measurement of variable parameters of interest, especially adaptable to hostile or explosive environments.

BRIEF SUMMARY OF THE INVENTION

The present invention obviates the foregoing disadvantages of prior art fluid type sensing devices by providing a unit which is compact, safe in an explosive environment and which does not incorporate moving parts for the operation thereof. The unit is thus capable of operating in hostile and explosive environments to measure parameters of interest therein upon demand from personnel who do not have to be subjected to the contaminants or dangers of the environment and who can thus work safely at a distance from the measuring equipment.

In accordance therewith, the present invention provides for an acoustic sensing system which comprises an acoustic wave generating means for propagating an acoustic wave, an acoustic wave receiving means positioned so as to be capable of receiving the acoustic wave and developing a perceptible output in response thereto, and a switching means for variably controlling the acoustic wave generating means to modulate the acoustic wave propagated thereby in response to the perceptible output of the acoustic wave receiving means.

Having briefly described an embodiment of the present invention, it is a principle object thereof to provide a new and improved acoustical sensing device.

It is another object of the present invention to provide a fluid type sensing device having no moving parts.

It is further object of the present invention to provide a fluid type sensing device which includes feedback loop means for gating the output of an acoustical wave generating means.

It is a still further object of the present invention to provide a fluid type sensing device which includes control means operationally connected to respond to the acoustic wave receiving means and to control the output of the acoustical wave generating means in a multivibrator mode.

It is an added object of the present invention to provide a fluid type sensing device which includes means for gating the acoustical wave generating means or source supply in accordance with a gating frequency which corresponds to the value of the variable parameter of interest.

It is an additional object of the present invention to provide a fluid type sensing device which includes means for adapting the instant gating frequency at which the acoustical wave generating means supply is operated in accordance with the sensed value of the variable parameter of interest.

BRIEF DESCRIPTION OF THE DRAWINGS

The present invention will be more readily apparent from an understanding of the following detailed description of one embodiment of the present invention when considered in conjunction with the accompanying drawings in which like reference numerals refer to like elements in the various figures and in which.

DESCRIPTION OF THE PREFERRED EMBODIMENT

Figure 1:
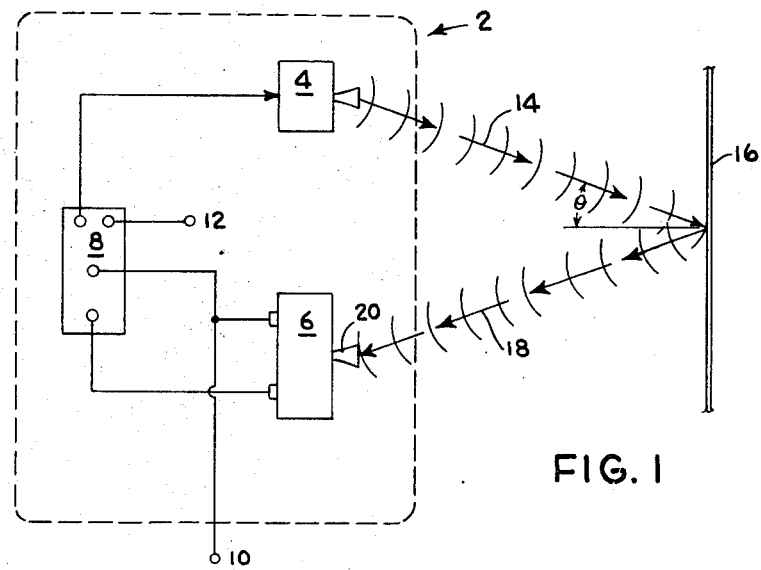
FIG. 1 illustrates in block form a network for a fluid type sensing device embodying the present invention.

An acoustic sensing system is shown generally at 2 in FIG. 1, and includes an acoustic wave generating means 4, an acoustic wave receiving means 6, and a switching means 8. A source of power or fluid pressure 10 is provided to supply the acoustic wave receiving means 6 and the acoustic wave generating means 4 through the switching means 8 with, for example, air under pressure. The output of the acoustic wave receiving means 6 is delivered to the switching means 8 and the system frequency is measured at terminal 12 which is connected to an output of the switching means 8.

An acoustic wave is illustrated at 14 being generated from the acoustic wave generating means 4 and directed toward a surface 16 capable of reflecting the acoustic wave. The wavefront of the acoustic wave 14 striking the surface 16 is reflected at an equal and opposite angle, as is well known, forming a reflected acoustic wave 18 which is received at an ear 20 of the exponential horn type of the acoustic wave receiving means 6, the output of which is in phase with its input. The switching means 8 is such that power is passed therethrough from the source of power 10 to the input of the acoustic wave generating means 4 while there is no signal present from the output of the acoustic wave receiving means 6 and power to the acoustic wave generating means 4 is interrupted when there is a measurable signal received from the output of the acoustic wave generating means 6.

Thus when the reflected acoustic wave 18 is received at the ear 20, a measureable signal is generated which when received at the switching means 8, interrupts the power supplied to the acoustic wave generating means 4 and the acoustic wave 14 is no longer generated. This absence of an acoustic wave 14 at the ear 20 changes the potential of the generated signal at the output of the acoustic wave receiving means 6 to its lower value which again changes the mode of operation of the switching means 8 to allow power to pass therethrough to the acoustic wave generating means 4.

It can be seen that the period of the generated signal at the output of the acoustic wave receiving means 6 is proportional to the time that it takes the acoustic wave 14 and the reflected acoustic wave 18 to travel from the acoustic wave generating means 4 to the ear 20. Thus the frequency of the generated signal is a measure of the distance between the acoustical sensing system 2 and a surface 16 or if the distance is known a measure of the physical properties of the medium through which the acoustic wave 14 travels as will be shown below.

Figure 2:
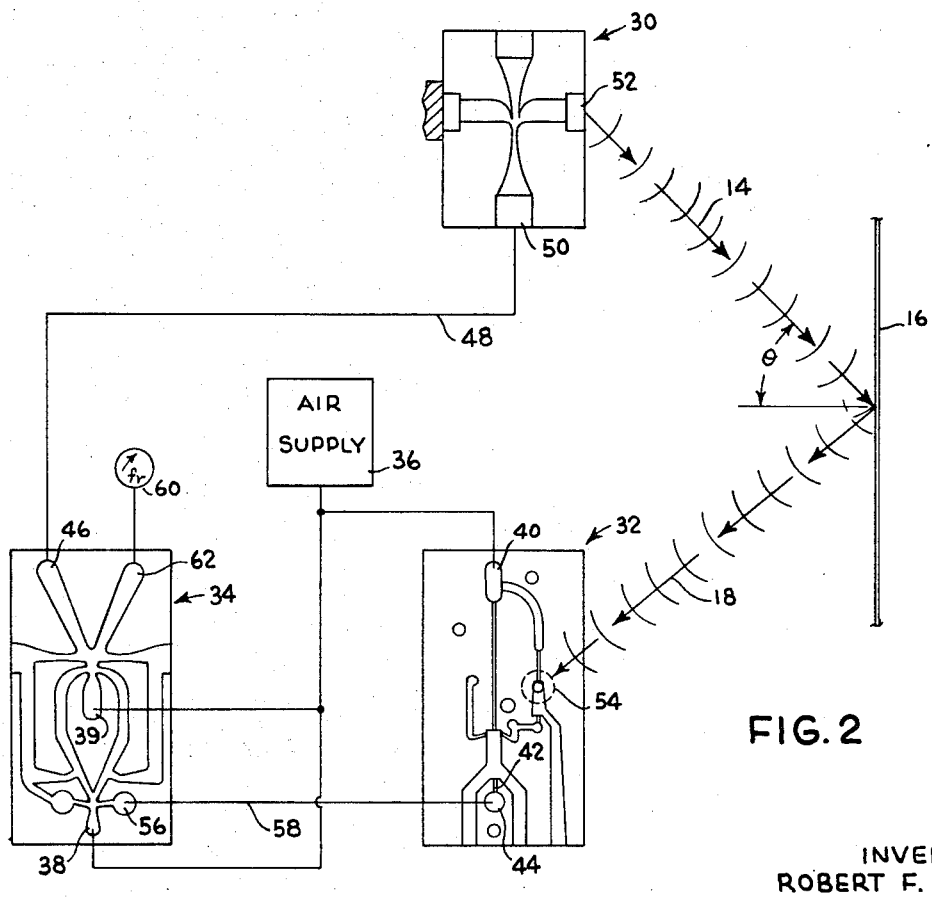
FIG. 2 illustrates in schematic form a network for a fluid type sensing device conforming to the block diagram shown in FIG. 1.

In FIG. 2, a whistle 30 is used as a specific embodiment of the acoustic wave generating means 4 of FIG. 1. The whistle 30 is described in U.S. Pat. No. 3,432,803 issued to B.B. Beeken on Mar. 11, 1969. Likewise, a sensing unit 32 is used as a specific embodiment of the acoustic wave receiving means 6 of FIG. 1. The sensing unit 32 is described in U.S. Pat. No. 3,500,952 issued to B.B. Beeken on Dec. 20, 1967. Finally, for a specific embodiment of the switching means 8 of FIG. 1 there is shown a fluid amplifier 34 which is described in U.S. Pat. No. 3,507,295 again issued to B.B. Beeken on Apr. 21, 1970.

The individual portions of the acoustical sensing device having been described by reference to published U.S. Patents, the operation of the device will be explained in greater detail with reference to FIG. 2.

It should be noted that the sensing unit 32 in the unit described herein, consists of two flow mode devices or two cascaded amplifier stages viz. a first low powered stage of amplification and a second higher power stage. The fluid amplifier 34 for example, a switching means for supplying fluid pressure to a fluid inlet also consists of two cascaded stages of amplification of a wall attachment device.

A fluid pressure source or supply 36 provides air under pressure to the main supply channel 38 and to the supply channel 39 of fluid amplifier 34 and to the fluid supply inlet groove 40 of the sensing unit 32. Let it be assumed that the amount of pressure in collector 42 and thus in the output 44 of the sensing unit 32 is initially in the lower mode. Then the fluid from the fluid pressure supply 36 passes through the main supply channel and supply channels 38 and 39, respectively, to collector output channel or outlet channel 46, through feed line 48 and into fluid supply inlet or fluid inlet 50 of the whistle 30. With fluid under pressure being received at the fluid inlet 50, the whistle 30 propagates a sonic or acoustic wave 14 of for example, 50 kilocycles per second out of cavity 52 which wave front is reflected off of surface 16 and forms reflected acoustic wave 18 which is received at a signal input or sound wave receiving opening 54 in sensing unit 32 which is a wave receiving means such as for example, a flow mode type amplifier. The signal input can include an exponential horn (as shown) which is well known, for greater sensitivity. Although acoustic wave 14 is shown exiting from cavity 52 at an acute angle, it should be understood that the axis of cavity 52 is substantially in line with acoustic wave 14.

Sensing unit 32 is a two stage fluidic amplifier arranged to produce a signal at the output 44 which is in phase with the envelope of the input signal received at sound wave receiving opening 54. Thus, with a positive pressure being received (viz. the presence of the envelope of the acoustic wave 18 at the source wave receiving opening 54) the higher mode or level of pressure is present at the output 44 and at control channel 56 through connecting line 58 which connects the former to the latter.

This higher pressure at control channel 56 interrupts the higher pressure fluid passing through main supply channel 39 to outlet channel 46, feed line 48 and fluid inlet 50, so that the whistle stops generating an acoustic wave 14. With the absence of the acoustic wave 14, there is in time, no longer a reflected acoustic wave present at the second wave receiving opening 54 and the output 44 being in phase therewith produces a lower pressure mode signal thereby changing the signal value at control channel 56 to the lower potential and effectively changing the flow operation of the fluid amplifier 34, to allow the air from the fluid pressure source 36 to pass to the fluid inlet 50 through the feed line 48 and thereby to initiate the whistle 30 to generate an acoustic wave 14.

Thus the fluid amplifier 34 and the sensing unit 32 are operated as monostable multivibrators and the signals produced at output 44 and at outlet channel 46 are square wave forms whose period is equal to the time lapse measured between the initiation of two successive acoustic waves 14.

A frequency meter 60 can be connected to outlet channel 62, for example, to display the frequency of the square wave. Alternately or in combination, as desired, the square wave can be used to initiate operations of equipment dependent on the parameters being measured, as is will known in the art.

The operations of this acoustic sensing system 2 is best understood with reference to various combinations of potentials which may be applied to the inputs.

Graphic illustrations of the signals applied to sound wave receiving opening 54, control channel 56 and fluid inlet 50 and of the signals received at output 44, outlet channel 46 and cavity 52 are shown in FIGS. 3A through 3F inclusive, but not necessarily in the order mentioned.

Figure 3:
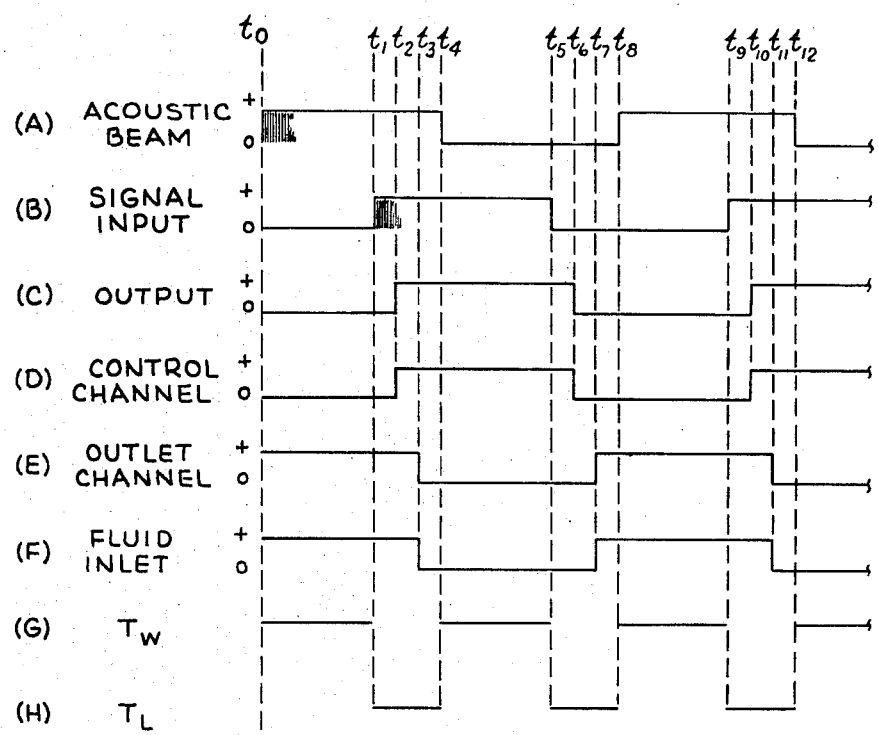
FIGS. 3A to 3H are timing diagrams for the signal responsive network shown in FIGS. 1 and 2.

In FIG. 3A, at time $t_o$, an acoustic wave 14 of + magnitude is being initiated from cavity 52. At time $t_1$, the wave front of the reflected acoustic wave reaches the sound wave receiving opening 54 (FIG. 3B) and the pressure increases from 0 to + at FIG. 3B under an envelope for example, of a 50 kc per second wave. Approximately 1 millisecond later at time $t_2$ (the response time averaged out for a fluidic sensing unit) the pressure at output 44 as shown in FIG. 3C and likewise the control channel 56 as shown in FIG. 3D rises from 0 to + (the flow time in the connecting line 58 being considered negligible). At approximately 1 millisecond later, (the response time of the fluid amplifier 34) time $t_3$ the pressure at outlet channel 46 (shown in FIG. 3E) drops from a pressure of + which it maintained from before $t_o$ to a pressure of 0. Simultaneously (because of negligible line loss time) the pressure at fluid inlet 50 (FIG. 3F) drops from + to 0. At time $t_4$ (which is 1 millisecond later than $t_3$ because of the whistle 30 response time) the generation of acoustic beam 14 at cavity 52 is abruptly stopped (FIG. 3A) and the pressure drops from + to 0.

This signals the end of the first half cycle of operation. At time $t_5$ [the periods $(t_1 - t_0)$ and $(t_5 - t_4)$ being the time it takes for the acoustic wave 14 to travel from the cavity 52 toward the surface 16 and back as reflected acoustic wave 18 into the sound wave receiving opening 54], the pressure wave enveloping the 50 kilocycle per second signal drops from + to 0 at sound wave receiving opening 54 (FIG. 3B). At $t_6$ the output 44 (FIG. 3C) and the control channel 56 (FIG. 3D) drops from a pressure of + to 0. Then 1 millisecond later at time $t_7$ outlet channel 46 (FIG. 3E) increases from a 0 to a + pressure and simultaneously fluid inlet 50 (FIG. 3F) increases from 0 to + pressure.

At 1 millisecond later, time $t_8$, the acoustical beam is again generated from cavity 52 (FIG. 3A). This is the second half cycle and it is repeated, as the acoustic wave is repeatedly initiated and extinguished.

The use of the acoustic sensing system can be seen from an analysis of the timing diagram. The time period (FIG. 3G) represented by $(t_1 - t_0)$ and $(t_5 - t_4)$ is the time it takes for the acoustic wave 14 to travel through the environment, and be reflected back to the sound wave receiving opening 54 and will be referred to as "$T_W$". The time period (FIG. 3H) represented by $(t_4 - t_1)$ and $(t_8 - t_5)$ is the time it takes for the closed loop to initiate a responsive change in the cavity 52 and will be referred to as "$T_L$". Therefore the total time "$T_T$" for one full cycle of operation, i.e., the time between the initiation of two successive acoustic waves 14 is:

$$T_T = 2(T_W + T_L)$$

and the frequency $f$, of the square wave is:

$$f = 1/T_T = 1/2(T_W + T_L)$$

where $$T_W = 2/c \cdot x/\cos\theta$$

where $x$ is the distance from the cavity 42 to the reflecting surface 16 and $c$ is the speed of propagation of sound, which is a known constant at known temperatures and environment conditions. However, because of the close relative spacing of the cavity 52 and the sound wave receiving opening 54 compared to the distance from the surface 16, the angle $\theta$ (FIGS. 1 and 2) is nearly 0° and therefore the cos $\theta$ is nearly 1. Therefore $$T_w = \frac{2x}{c}$$

and $$f = \frac{1}{\frac{4x}{c} + 2T_L}$$

or since $T_L$ and $c$ are known if solved for $x$:

$$x = c/4f - cT_L/2 = c\left\{1/4f - T_L/2\right\}$$

And therefore the distance $x$, can be obtained from a knowledge of the frequency of the circuit, with $c$ a known variable and $T_L$ fixed for each circuit. Where $x$ is a known constant, the temperature, density or composition of a fluid environment through which the acoustic beam 14 travels which are all well known functions of $c$, can be obtained. The relationships of these parameters are well known and one skilled in the art can easily use one or more acoustic sensing systems to measure temperature or compositions or density on the basis of the instant disclosure.

Figure 4:
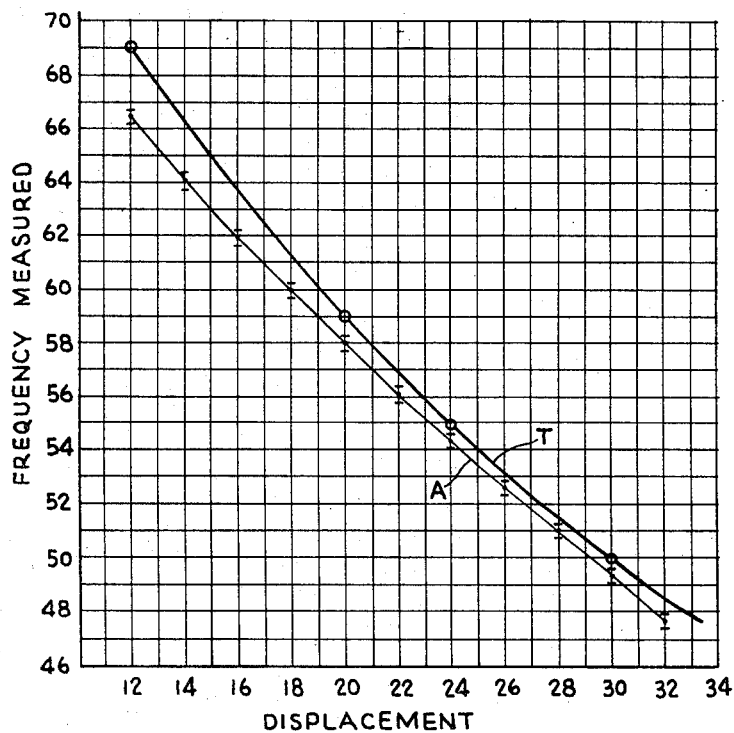
FIG. 4 illustrates a graph of displacement of an object of interest from the inventive fluid type sensing device plotted against frequency of the pulses modulating the acoustical wave generating means which demonstrates the accuracy of the device.

An example of measurements of $x$ made with an embodiment of the acoustic sensing device is shown in FIG. 4 which is a graph of displacement of an acoustic reflecting surface from the inventive embodiment of the acoustic sensing device plotted against the frequency measured for each displacement. Both the theoretical curve $T$ and the actual curve $A$ are shown for comparison.

Each measurement was made over a 10 second count interval so that the resolution of the measurements are approximately one-fourth inch as shown by the band marks at each plotted point. It can be seen from FIG. 4 that the theoretical line $T$ asymptotically approaches the actual curve A as the displacement is increased. This can be attributed to the cos $\theta$ function which was considered negligible during measurements, since the angle $\theta$ more closely approaches 0° as the displacement increases.

Although not completely understood, it is proposed that the only theoretical requirements for a device to operate as described hereinabove is that a sonic generator be controlled as to its output in accordance with a positive feedback of the energy output which feedback is a function of an energy wave reflecting substantially all of the energy back to the feedback circuit. Because of the nearly 100 percent positive feedback the feedback circuit is operated as a relaxation oscillator so that the oscillators are in two distinct regions of operation producing a square wave control of the sonic generator.

It is thus apparent from the foregoing that there has been provided an acoustic sensing device which achieves the foregoing objects and advantages of the present invention. The acoustic wave receiving means can be a two stage fluidic amplifier as shown or any amplifier which has its output in phase with its input or out of phase with its input by adjusting the switching means accordingly. The acoustic wave is thus amplitude modulated between an "on" state and an "off" state whereby the acoustic wave generating means produces an output which includes a carrier wave and the output is larger than the carrier wave during the "on" state and the output is equal to the carrier wave during the "off" state. The carrier wave is preferentially of a substantially "0" potential. As an example, the switching means can be relaxation type, specifically a monostable multivibrator as shown, and its output should be such that power is delivered to the acoustic wave generating means in response to no reflected wave being present at the acoustic wave receiving means and vice versa. It is to be understood that the invention is not to be considered as limited to the specific embodiment described above and shown in the accompanying drawings, which embodiment is merely illustrative of the best mode presently preferred for carrying out the invention and is susceptible to change in form, size, detail and arrangement of components, but rather the invention is intended to cover all such variations, modifications, and equivalents thereof as may be deemed to be within the scope of the claims depended hereto.

We claim:

1. An acoustic sensing system comprising:
   a. a whistle for propagating a sonic wave in a medium, said whistle having a fluid supply inlet
   b. wave receiving means including a flow mode type amplifier having a signal input channel, an emitter channel and a collector output channel, said emitter channel being connected to a supply of fluid under pressure so as to cause a jet of fluid to be issued from said emitter channel towards said collector, output channel, said signal input channel being adapted to receive said sonic wave and direct the same against said jet of fluid so as to thereby switch the mode of operation of said amplifier and thus vary the output pressure in said collector output channel
   c. a fluidic amplifier for supplying fluid pressure to said fluid inlet of said whistle under the control of said fluid output pressure in said collector output channel of said flow mode type amplifier; said fluidic amplifier having a supply channel connected to the supply of fluid under pressure, a control channel connected to the output channel of the flow mode type amplifier, and a collector channel connected to the fluid supply inlet of the whistle; said fluidic amplifier being operatively connected to change the amount of fluid pressure applied to said inlet of said whistle from a first level to a second level when said fluid output pressure from the collector output channel of the flow mode type amplifier is indicative of said sonic wave being present at said signal input channel and to reverse the amount of fluid pressure applied to said whistle fluid inlet to said first level when said sonic wave is absent at said signal input channel, said whistle producing said sonic wave only when the fluid pressure applied to its inlet is at said first level, whereby said sonic wave is intermittently automatically generated by said whistle in a periodic manner such that the wave period is a function of inter alia the distance that said sonic wave travels through said propagating medium.

2. Apparatus as defined by claim 1, wherein said whistle includes a cavity, and said cavity and said signal input channel are mutually spaced from the surface of a sound reflecting medium to be sensed whereby said sonic wave propagated through said medium by said whistle is reflected at said surface toward said signal input channel.

3. Apparatus as defined by claim 2, wherein said flow mode type amplifier includes a first and second stage amplifier, said first stage amplifier having a first stage collector channel, said emitter groove channel and said signal input channel and said second stage amplifier having said collector channel, a second stage emitter groove channel and a second stage signal input channel, said first stage collector channel being operatively connected to said second stage signal input channel so that said signal appearing at said first stage collector channel is amplified thereby.

4. Apparatus as defined by claim 3, wherein said emitter groove of said first stage amplifier includes an exponential ear having its output connected to said emitter groove and its input at the opposite end thereof and the axis of said exponential ear being substantially parallel to the axis of said cavity of said whistle.

* * * * *